United States Patent [19]

Saari et al.

[11] Patent Number: 5,049,398

[45] Date of Patent: Sep. 17, 1991

[54] METHOD OF PREPARING MICROWAVE BREAD

[75] Inventors: Albert L. Saari, Long Lake; James E. Langler, White Bear Lake; Robert C. Dechaine, Minneapolis; Eugene R. Monroe, Mound; James P. Bergstrom, Golden Valley; Willis P. Kusske, Minneapolis, all, Minn.

[73] Assignee: General Mills, Inc., Minneapolis, Minn.

[21] Appl. No.: 449,048

[22] Filed: Dec. 8, 1989

[51] Int. Cl.$^5$ .............................................. A21D 8/02
[52] U.S. Cl. ........................................ 426/20; 426/62; 426/243; 426/391; 426/549
[58] Field of Search ............... 426/20, 549, 19, 27, 426/62, 243, 391

[56] References Cited

U.S. PATENT DOCUMENTS

| | | | |
|---|---|---|---|
| 3,780,188 | 12/1973 | Tsen et al. | |
| 4,393,084 | 7/1983 | Pomper et al. | 426/19 |
| 4,404,227 | 9/1983 | Pomper et al. | 426/19 |
| 4,463,020 | 7/1984 | Ottenberg | 426/19 |
| 4,477,479 | 10/1984 | Jervis | 426/549 |
| 4,560,559 | 12/1985 | Ottenberg | 426/19 |
| 4,824,683 | 4/1989 | Hodgson et al. | 426/62 |
| 4,911,939 | 3/1990 | Lou et al. | 426/551 |

OTHER PUBLICATIONS

Matz, S. A., Equipment for Bakers, 1988, p. 333, Pan. Tech. International, Inc., TX.
Matz, S. A., Formulas and Processes for Bakers, 1987, pp. 170, 220, Pan-Tech. International, Inc., TX.
Matz, S. A., Bakery Technology and Engineering, 1972, pp. 312-313, Pan-Tech. International, Inc., TX.

*Primary Examiner*—Donald E. Czaja
*Assistant Examiner*—Leslie Wood
*Attorney, Agent, or Firm*—John A. O'Toole

[57] ABSTRACT

Disclosed are fresh, baked bread products having extended shelf lives which are prepared specifically to be reheated/refreshed in a microwave oven employing a metallized film susceptor sleeve. Upon this microwave refreshening, the preheated loaves are characterized by a soft interior crumb and a crispy crust. The products have a shelf life of about 7-14 days. Also disclosed are methods for preparing such baked bread products as well as full formulation dry mixes and partial formulation pre-dry mixes for their commercial scale production by both the sponge dough and straight dough methods. The preparation methods involve first prehydrating a defined dough conditioner system and pregelatinized starch to form an emulsion, combining the emulsion with the other ingredients to form a dough and finish preparing the dough to produce a finished microwave baked bread loaf.

17 Claims, No Drawings

METHOD OF PREPARING MICROWAVE BREAD

CROSS-REFERENCE TO RELATED APPLICATION

A co-pending, commonly assigned patent application entitled "MICROWAVE BREAD ARTICLE AND METHOD," Ser. No. 440,068, by Barry Mikulski, filed on Nov. 22, 1989, contains subject matter related to this application and is incorporated herein by reference.

1. Technical Field

The present invention relates to food products and to their methods of preparation. More particularly, the present invention relates to fresh baked bread loaves which are specifically adapted to be reheated in a microwave oven by a metallized film susceptor sleeve and to methods for their commercial scale production.

2. Background of the Invention

Warm, freshly baked bread just out of the oven has a look, taste and aroma appeal that is unique. Ideally, the bread has a warm, soft interior crumb texture and many prefer the crisp crust characteristic of french bread. Unfortunately, this uniquely desirable combination of bread characteristics is difficult and time consuming to achieve for the average consumer.

While home baked bread is most preferred, due to the efforts required to prepare, most bread is commercially produced. Most commercially prepared bread is sold fresh, i.e., fully baked and at room temperature, and such bread is typically locally baked so that distribution from the bakery to the consumer can be completed within the first day or two to provide maximum freshness. Bread begins to stale immediately after baking due primarily to starch retrogradation and rapidly loses its appeal. While the problems of maintaining the freshness of all breads are difficult, crisp or hard crust bread types such as french style bread have even shorter shelf lives. With hard crust breads, the breads deteriorate due not only to starch retrogradation, but also to the loss of the crust's crispy texture due to moisture migration. Thus, crisp crust breads such as french breads are ideally consumed the same day as baked.

A great deal of effort, however, has been directed toward providing bread products which offer varying levels of convenience and which reproduce warm fresh bread to varying degrees. Frozen bread dough items are well known which upon thawing can be shaped into loaves, proofed and baked in a conventional oven. Even greater convenience is provided by products that are referred to as "brown-and-serve" products. These products generally are partially baked items which are finished baked by the consumer in a conventional oven. While generally brown-and-serve products are sold as fresh, i.e., distributed at room temperature, frozen brown-and-serve products are also known. While convenient, the preparation of brown-and-serve products still requires a lengthy preheating of the oven, typically for five minutes or more and then a finish baking step of about 10-20 minutes. If heated directly by microwaves, brown-and-serve items become soft and soggy and very unappetizing.

Even more convenient than finish baking is to merely reheat or refresh a bread product. Common fresh breads, of course, can be reheated or refreshed in a conventional oven, a toaster oven or even in a microwave oven. The heat transfer mechanism of conventional and toaster ovens on the one hand and microwave ovens on the other differ considerably. Both a conventional oven and a toaster oven operate on a combination convection and radiant heating, although varying in relative contribution. Each heat the outer surface of the food and are effective in browning/crisping the food crust. While useful, both conventional and toaster ovens require more time to reheat than microwave ovens. Unfortunately, however, microwave heating of breads initially results in warmed breads characterized by a soggy, mushy character. Previously crisp crusts are also softened. However, upon even modest further heating, the breads quickly toughen and become dry in texture.

To overcome this problem, many bread products have been developed which additionally include a microwave susceptor. More particularly, it is known to envelope a food article with an elongated susceptor sleeve (see, for example, U.S. Pat. No. 4,775,771, issued Oct. 4, 1988 to Pawlowski et al. entitled Sleeve For Crisping And Browning Foods In A Microwave Oven And Package And Method Utilizing Same) to provide crisping to the loaf crumb. Improved microwave susceptor sleeve/microwave bread articles having superior food-to-susceptor contact and ease of customer assembly and use are described in the co-pending, commonly assigned patent application entitled Microwave Bread Article and Method. Unfortunately, however, the interior of refreshened conventional bread loaves used in combination with the there disclosed microwave susceptor sleeve still becomes tough and/or dry in texture. Moreover, even if the interior texture is acceptable immediately upon refreshening, their table life before the onset of unacceptable toughening is short. Finally, these problems are further aggravated as the fresh bread loaf rapidly ages at room temperature which leads to both loss of initial quality and to decreased table life.

Given the state of the art, there is a continuing need for new and useful fresh, baked bread products which are adapted to be reheated in a microwave oven to provide a refreshened bread loaf having the crust and texture attributes comparable to a freshly baked bread. Accordingly, it is an object of the present invention to provide microwave bread articles adapted for microwave reheating with a susceptor sleeve which upon so heating provides a refreshed bread having a crisp crust and a soft but not tough texture.

It is a further object of the present invention to provide a microwave bread product having room temperature shelf lives of at least one week.

It is a further object of the present invention to provide a fresh baked bread product of extended shelf life which upon microwave refreshening exhibits extended both cut and uncut table lives.

Still another object of the present invention is to provide microwave bread products, formulations therefor, and methods of preparation that can be used employing a wide variety of conventional baking apparatus and techniques so that employment of specialized equipment is not required.

Still another object of the present invention is to provide a microwave bread exhibiting resistance to toughening upon microwave heating which nonetheless exhibits minimal off-flavors due to emulsifier selection and concentration.

It has been surprisingly discovered that the above objectives can be realized and improved microwave bread articles provided by the present bread formulations and methods of formulation. In its composition aspect, the present invention resides in the discovery that by emulsifying a dough conditioning system and combining the preferred dough conditioning system with particular levels of pregelatinized farinaceous material and adding the so-formed emulsion to a bread dough that bread formulations can be beneficially specifically adapted for microwave susceptor refreshening. In its process aspect, the present invention resides in methods for preparing the present baked bread products. The methods importantly include the steps of prehydrating the dough conditioner and forming an emulsion of water, dough conditioner, and the pregelatinized starchy material prior to admixing with the other ingredients to form a dough.

To achieve the objects in accordance with the purpose of the invention, as embodied and broadly described herein, the invention comprises a yeast raised wheat based food product, particular levels of defined dough conditioning system, and a pregelatinized starchy component in an effective amount to improve the table life of the food product upon exposure to microwave heating.

SUMMARY OF THE INVENTION

In its product aspect, the present invention relates to a baked bread especially adapted to be refreshed in a microwave oven using a microwave sleeve susceptor. The bread loaf formulation essentially comprises flour, water, yeast, salt, oil, a farinaceous component having its starch component being pregelatinized and dough conditioner(s).

In another product aspect, the present invention resides in dry mixes and dry premixes useful in the preparation of the finished baked goods of the present invention. The dry mixes comprise a first emulsion premix fraction essentially comprising a dough conditioner(s), a farinaceous material having a pregelatinized starchy component and a second dough premix fraction comprising flour, yeast, salt, and oil.

In its method aspect, the present invention resides in methods for preparing improved bread doughs and to methods for preparing the present baked goods from the present dry mixes. The present methods essentially comprise forming an emulsion comprising 1) water, 2) the dough conditioning agent(s) and 3) the pregelatinized farinaceous component, and thereafter admixing the emulsion with the other dough ingredients to form an improved bread dough and finish preparing the improved dough to form the present improved fresh baked bread articles especially adapted to be microwave susceptor refreshened.

DETAILED DESCRIPTION OF THE INVENTION

The present invention resides in microwave baked bread loaves which are especially suitable to be reheated in a microwave oven employing a metallized film susceptor sleeve. The present invention relates further to bread formulation dry mixes, to dry premixes useful in the preparation of the present microwave bread products and to methods for their preparation. Each of the bread formulation and dry mix ingredients and process preparation steps are described in detail below.

Throughout the specification and claims percentages are baker's formula percentages, that is, parts of weight per 100 parts flour and temperatures are in degrees Fahrenheit unless otherwise indicated.

There are three principal processes used in baking bread type products, namely, the straight dough, the sponge dough, and the brew process. The present invention is applicable to all of these, but is particularly useful with the sponge dough process. In the straight dough process, for example, all ingredients are mixed into the dough and the bread is baked after the yeast has been allowed to ferment, both the sugars present in the flour and any added sugars. The sponge dough method comprises adding to a part of wheat flour the whole amounts of yeast and optionally, yeast food and a part of water, mixing them together to prepare a sponge dough, fermenting the dough, adding to a fermented dough the remaining wheat flour, other ingredients, then oil or fat and the remaining water, mixing the dough to a considerable extent, followed by addition of oil or fat, thoroughly mixing the ingredients to prepare a dough, giving the dough to a floor time to rest, and dividing, after which the subsequent steps are performed in accordance with the straight sponge dough method which includes benching, molding, final proofing and baking.

In addition to these two batch methods for dough preparation, the brew process is a continuous process for preparing bread dough. In the brew process, a fermented yeasty brew is prepared and continuously added along with the other ingredients to a special extruder which combines the ingredients and works the mixture into a dough. The practice of making commercial bread by the batch dough and sponge dough processes has been replaced, in many instances, by the more expedient brew method for manufacturing dough which is continuous from the point at which dough ingredients are initially mixed until such time as the dough is placed in pans, finally proofed and ready for the oven. The continuous process has eliminated the need for the divider, rounder, overhead proofer and molder customarily employed in the straight dough and sponge dough processes. Elimination of these pieces of apparatus and their intended functions has greatly reduced the time required for preparing bread dough; whereas six to seven hours were once required to process dough ingredients by the batch dough or sponge dough processes, the processing of continuously prepared bread dough can be completed in about one and one half hours, including the time required for final proofing.

As indicated above, regardless of the dough preparation method employed, generally, the baker in conventional practice will purchase a complete, blended bread dry mix to which the baker will add water to form a sponge and/or a bread dough and will subsequently process this bread dough to produce the finished, fresh baked bread products. In another variation of conventional practice, the baker will purchase a dry, premix to which the baker will add flour out of the baker's inventory. This dry premix can contain various minor ingredients such as salt, sugar, oil, nonfat dry milk, dough conditioners and other minor ingredients along with some, but less than all the requisite wheat flour, i.e., the premix will be flour lean.

Of course, the present improved bread formulations, bread dough and finished baked bread are compositionally equivalent on a dry basis and differ primarily on the amount of moisture present at their several stages of preparation. For this reason, the following bread formulation description express ingredient concentrations using the baker's percentage convention. The baker's percentage convention expresses all concentrations baked upon 100 parts of flour in the dough.

As indicated briefly above, the present invention resides in improvements in bread making, i.e., bread formulation, bread doughs and finished baked breads, which improvement resides in the combination of including into the bread an amount of pregelatinized starch material effective to tenderize the bread crumb and to preemulsifying a dough conditioner with the pregelatinized starchy material.

Accordingly, in preferred embodiments, the dry formulation is divided into two premix factions so that the present processes (described below) can be performed more conveniently. These factional premixes comprise 1) an emulsion premix and 2) a dough premix. This embodiment is referred to herein as the "emulsion addition" embodiment. The emulsion premix essentially comprises the dough conditioner and the pregelatinized starch, and optionally, the oil. The dough premix essentially comprises the balance of the bread formulation ingredients. In a minor variation, the dough premix can be flour lean so that the baker can make up the flour from its inventory.

In addition to bread flour(s), the present bread dry mix formulations additionally essentially include yeast, salt, oil, and importantly, a pregelatinized starchy or farinaceous material or prebaked flour component and minor conventional ingredients within the ranges set forth in the following Table 1.

TABLE 1

| Bread Formulation Major Ingredients | | |
|---|---|---|
| Ingredient | Amount (Broad Range) | Amount (Preferred Range) |
| Flour | 100 | 100 |
| Yeast | 0.5 to 8 | 1 to 7 |
| Salt | 0.5 to 8 | 1 to 3.5 |
| Dough conditioner | 0.1 to 5 | 0.3 to 3 |
| Pregelatinized Starch | 1 to 20 | 2 to 10 |
| Oil | 0.5 to 10 | 1 to 6 |

The bread formulation can additionally include minor amounts of other optional conventional bread ingredients such as egg solids, mineral yeast food, preservatives, vitamins, flavors, mineral supplements especially calcium, mold inhibitors such as calcium propionate, malt and malt syrups employed at conventional levels.

The main ingredient of the present dry bread mixes, of course, is conventional bread flour. Suitable flours are those conventionally employed in the preparation of bread and selection of appropriate flours pose no problems for the skilled artisan. Such suitable flours are broadly derived from cereal grains such as wheat, rye, oats, barley, corn and the like. The gluten or protein content of the flour can vary within normal ranges, e.g., 5% to 15%. Even lower protein content flours can be used in part if the vital gluten content averages at least 5%. For the production of bread from the present mixes, flour with the higher gluten content is preferred, or if the gluten content of a flour employed can be fortified by the addition of vital gluten to bring the total gluten content of the aggregate flour to from about 10% to about 15%. Of course, various mixtures of flours can be employed, e.g., multi-grain mixtures of oat flour, wheat flour, barley flour, rye flour and the like. The type of flour employed will be selected not only for its gluten content, but also its desired flavor and texture imparting characteristics to achieve the desired type of bread. Among the suitable flours are high gluten wheat, rye flour, pumpernickel, whole wheat flour, cracked wheat flour, and other bleached and unbleached flours.

The yeast component can be supplied from one or more common forms of conventional yeast varieties. Useful herein are active dried yeast of the Saccharomyces cerevisiae variety. For sour dough breads, yeasts from the Lactobacillus brevis variety can additionally be used. The active dry yeast can be substituted by fresh yeast cake, if desired, which also can come from the baker's inventory.

The present bread formulations can optionally additionally further include about 0 to 8 parts of a sugar(s) to facilitate rapid yeast incubation. Although any sugar(s) material can be employed, e.g., high fructose corn syrup, common sucrose is most convenient. The bread formulation can further comprise a mineral yeast food which provides mineral fortification to promote rapid yeast development. Such mineral yeast foods are well known and commercially available and the skilled artisan will have no difficulty in selecting useful materials.

The dough conditioning system is essential to providing the anti-staling, anti-toughening and tenderizing properties for the microwave bread product. The type and proportion of emulsifier, and its method of addition influence the degree of improvement. The term "dough conditioner" can and is used in a very general sense to refer to any material which beneficially improves one or more attributes of a dough or baked good prepared from the dough. Broadly, the present dough conditioning system comprises any suitable surfactant useful for enhancing the anti-staling and anti-toughening of a bread crumb. Useful herein as dough conditioners are hydroxylated lecithin, mono- and di-glycerides of fatty acids, diacetyl tartaric acid esters of mono- and di-glycerides of fatty acids ("DATEMS"), ethoxylated mono- and di-glycerides, calcium stearoyl lactate, sodium stearoyl-2-lactylate, and mixtures thereof. In more preferred embodiments, the dough conditioner comprises a first emulsifier blend comprising diacetyl tartaric acid esters of mono- and di-glycerides and mono- and di-glycerides or sodium alginate available from Grinslead Products, Inc. under the trade name "Panodan" and a second emulsifier blend comprising propylene glycol, mono- and di-esters of fats and fatty acids, nonfat milk, mono- and di-glycerides, lecithin in a carrier of partially hydrogenated soybean oil with disodium phosphate available from Beatrice Foods Ingredients, Inc. under the trade name "Bealite."

The dough further essentially comprises a pregelatinized farinaceous material, that is, any farinaceous material whose starch component has been gelatinized. The pregelatinized farinaceous material, it is believed, surprisingly provides benefits with regard to softening the crumb texture upon microwave refreshening without materially adversely affecting the crispness of the crust. Useful as the pregelatinized farinaceous material are a wide variety of flour based and starch materials. Exemplary useful materials include expanded dry wheat paste which is a 100% pregelatinized wheat flour. Also useful herein is pregelatinized sweet rice flour. Preferred for use herein as the pregelatinized farinaceous material is a member selected from the group consisting of a prebaked flour (also known as bread regrinds), pregelatinized starch and mixtures thereof. The pregelatinized starch can be derived from wheat, rice, corn, potato or other common cereal grains.

The present bread products essentially additionally comprise a triglyceride component, i.e., an oil or fat (i.e., solid at room temperature) at higher concentrations than typically employed in crusty bread products. Useful as the oil or fat or mixtures thereof ingredient(s) are those edible fatty triglyceridic materials well known in the food art. Preferred for use herein are liquid oils, especially oils derived from vegetable oil sources such as soybean, corn, cottonseed, canola, safflower, sunflower and mixtures thereof when the triglyceride component is to be added in whole or in part to the emulsion. A solid fat or shortening is preferred when the present triglyceride component is to be added in whole or in part to dough dry ingredients. It will be appreciated from the above Table 1 that the oil component is employed herein in at substantially higher levels than is known for hard crust type products. The selection of relatively high oil component levels provides for greater moistness and tenderness upon extended microwave heating.

METHOD OF PREPARATION

Emulsion Preparation

In the present methods of bread making, the first essential step is to form an emulsion essentially comprising the dough conditioner, a portion of the water (preferably warmed to about 150° F.) and the pregelatinized farinaceous material. A representative emulsion will have the following emulsion composition:

TABLE 2

| Emulsion Composition | | |
|---|---|---|
| Ingredient | Weight % of Emulsion | Baker's % |
| Dough conditioner | 0.1 to 6.0, | 0.1 to 3, |
| preferably | 0.5 to 4.0 | 0.1 to 1.0 |
| Water | 55 to 90, | 7 to 30, |
| preferably | 60 to 75 | 7 to 16 |
| Prebaked farinaceous matter | 15 to 50, | 1 to 20, |
| preferably | 20 to 40 | 2 to 10 |

While the emulsion should comprise these essential ingredients in other useful variations of the present bread making methods, the emulsion can additionally comprise all or some of one or more of the minor bread formulation ingredients excluding only the flour and yeast. In particular, good results are obtained when the emulsion further contains the present oil component. The emulsion also beneficially allows the dough conditioners to prehydrate which prehydration in turn provides additional benefits of increasing the table life in the final product and modestly improving shelf life.

The emulsion can be prepared conveniently by adding water to a preformulated emulsion premix dry blend. In a preferred embodiment, this dry blend can comprise:

TABLE 3

| Emulsion Premix Dry Blend Formulation | | |
|---|---|---|
| Ingredient | Weight % (Dry Basis) | Baker's % |
| Salt | 10 to 40, | 10 to 40, |
| preferably | 15 to 35 | 10 to 26 |
| Sugar | 0.01 to 65, | 10 to 65, |
| preferably | 10 to 50 | 10 to 42 |
| Dough conditioner(s) | 0.01 to 30, | 1 to 35, |
| preferably | 15 to 25 | 1 to 20 |
| Mold Inhibitor | 0.01 to 7, | 1 to 7, |
| preferably | 1 to 5 | 1 to 3 |
| Prebaked farinaceous | 0 to 70, | 0.1 to 20, |

TABLE 3-continued

| Emulsion Premix Dry Blend Formulation | | |
|---|---|---|
| Ingredient | Weight % (Dry Basis) | Baker's % |
| material | 45 to 60 | 0.1 to 7 |
| preferably | | |
| Oil | 0 to 35, | 0 to 10, |
| preferably | 0 to 5 | 0 to 2 |

In commercial practice, it is contemplated that most of the prebaked farinaceous material will be supplied by the baker using bread regrinds from previous batches.

Dough Formulation

Thereafter, this emulsion is then added to the other bread formulation ingredients and the admixture formed is kneaded to form the present novel improved bread dough whether employing the sponge method or straight dough method or the brew process for dough formation. It will be appreciated that the present doughs are slightly higher in moisture content. Desirably, dough moisture contents range from about 40% to 48%, preferably about 44% to 46% by weight of the dough (55% to 75%, preferably 60% to 70% expressed as Baker's percent).

The novel dough products so prepared are then further processed using conventional baking steps to prepare the novel baked microwave bread loaves. It is to be appreciated, however, that while these steps will be generally familiar to the skilled artisan, it is important in the preferred embodiments that the steps be practiced as described. In sequence, these essential steps generally comprise of resting the dough, dividing the dough into shaped pieces, proofing, baking, cooling the baked loaves and packaging.

Dough Resting

After dough formation, the dough is desirably rested for floor times ranging from about 5 to 120 minutes, preferably about 15 to 90 minutes. The term "floor time" is used herein in its conventional meaning to refer to the idle time that the mixed dough product is required to wait before being shaped and proofed prior to dividing the dough into shaped pieces.

Dividing

Thereafter, the rested dough is divided into suitably sized amounts, typically for use herein about 150 to 250 g, preferably about 200 g, and then charged to pans. The panned dough pieces are then allowed to proof to form raised dough pieces which in turn can be washed or sprayed with protein, e.g., egg white, to give a shiny crust to the end product.

Preferred for use herein are "pup" loaves, i.e., cylindrical loaves ranging in length from about 9 to 11 inches (230 to 280 mm) and weighing about 210 to 230 g. While the present bread formulations find particular suitability for use in the preparation of crusty bread loaves adapted to be microwave susceptor refreshened, the present yeast raised wheat based bread formulations can be used for a wide variety of bread shapes and sizes typical of bread products.

Baking Step

The raised dough pieces having a moisture content of about 45% by weight of the dough are then baked at about 400° F. optionally with steam for about 5 to 15 minutes, preferably about 20 minutes to form the present baked bread having a crisp crust having a moisture content of about 28% to 36%. The improved fresh baked bread loaves are initially characterized by all the desirable attributes of a fresh warm baked bread product.

In preferred embodiments, the yeast raised wheat based food product is a crusty white or dark bread product, such as but not limited to, white bread (especially French or Italian), rye bread, whole wheat bread, pumpernickel bread, raisin bread, multiple grain bread, or sour dough bread.

The fresh microwave baked bread loaves so prepared can then be packaged in a suitable container, e.g., clear, twist sealed plastic with an appropriate number of microwave susceptor sleeves. A good description of microwave food articles comprising a susceptor sleeve and the present fresh baked bread product is given in the commonly assigned patent application entitled Microwave Bread Article referenced above. Also useful, but less preferred, are the microwave sleeves described in detail in the '771 patent referenced above.

It will be appreciated that immediately upon cooling that the present microwave bread loaf products are characterized by a more or less crisp crust. However, upon storage, especially in a moisture proof package, the crust softens over time due to moisture migration.

In use, the present bread loaves are positioned within the microwave susceptor sleeve by the consumer, placed within a microwave oven and heated for about 1.5 to 3.5 minutes to refreshen the baked bread loaf. Preferably, the heating step is interrupted about half way to rotate the food item within the microwave oven if the oven has poor microwave distribution unless equipped with a carousel.

Upon microwave freshening with the susceptor sleeve, the present refreshened microwave bread loaves are characterized by a superior texture combination including a crisp crust and a soft moist interior as well as a pleasing, yeasty bread aroma. In the package, the present baked loaves have a room temperature shelf life of about one to two weeks before table life materially deteriorates. An advantage of the present microwave fresh baked bread products is that the reduced toughening attribute and extended table life benefits are provided even by bread products which have been stored at room temperature for up to two weeks after baking. Of course, the present baked bread loaves can be stored for extended periods by freezing. If frozen, then the loaves can even be refreshened directly from a frozen state, although the reheating/refreshening step may require a slightly longer duration. While the present breads provide unexpected benefits and are especially adapted to be microwave refreshened or by reheating with a microwave oven, it is an additional surprising advantage that the breads' texture will exhibit the present benefits upon reheating by a conventional oven or toaster oven.

Industrial Application

The present invention is particularly suitable for the commercial bakery scale production of fresh baked, yeast raised, wheat based bread products to be sold at retail.

Without further elaboration, it is believed that one skilled in the art can, using the preceding description, utilize the present invention to its fullest extent. The following preferred specific embodiments are, therefor, to be construed as merely illustrative and not limitative of the remainder of the disclosure. It will be appreciated that other modifications of the present invention, within the skill of those in the food art can be undertaken without departing from the spirit and scope of the invention.

EXAMPLE 1

An improved fresh baked French bread loaf product of the present invention was prepared by the straight dough process having the following composition:

| Ingredient | Baker's Percent | Weight |
|---|---|---|
| Flour | 100.0 | 750 g |
| Yeast, cake | 4.0 | 35 |
| Sucrose | 5.0 | 50 |
| Soy oil | 2.0 | 75 |
| Salt | 1.5 | 27 |
| Emulsifier[1] | 1.5 | 20 |
| Potassium sorbate | 0.5 | 2 |
| Bread regrinds | 5.0 | 37.5 |
| Water | 56.0 | 420 |

[1] A spray dried emulsifier powder on a nonfat milk carrier of propylene glycol, mono- and di-esters of fats and fatty esters, mono- and di-glycerides, partially hydrogenated soybean oil with lecithin available from Beatrice Food Ingredients, Inc. under the trade name Bealite 3401-L.

An emulsion was formed by adding the emulsifier dough conditioner and the bread regrinds by mixing with 250 g of cool water and microwave heating to about 120°. The emulsion was then formed by adding the oil and stirring vigorously, and homogenized with a hand homogenizer to form a thick creamy paste. Thereafter, the oil/water/condition/regrinds emulsion was added to the balance of the water in a mixing bowl to which the remaining dry ingredients were then added and kneaded to form a bread dough. The dough was then proofed for 105 minutes in an air oven (dough temperature between 88° to 93° F.). The proofed dough was divided into 180 g pup loaves which were then placed in pans, proofed for 45 minutes and baked for 20–21 minutes at 425° F. with steam to form baked bread loaves. The baked loaves were about 10½ in. (268 mm) in length and about 210 mm in circumference.

The loaves were then stored for seven days at room temperature in a moisture proof container. The aged loaves were then inserted into a microwave sleeve and microwave heated for three minutes with one intermittent turn. The microwave refreshed loaves were characterized by a crisp crust and a soft chewy crumb texture. The table life of the cut bread loaf was close to 30 minutes before staling.

EXAMPLE 2

A French bread style microwave bread is prepared by the sponge dough method having the following formulation:

| Ingredient | Baker's % |
|---|---|
| Sponge Formulation | |
| Wheat flour | 60.00 |
| Water | 35.00 |
| Yeast | 2.00 |
| Dough Formulation | |
| Wheat flour | 40.00 |
| Water | 10.00 |
| Sugar | 4.00 |
| Salt | 2.00 |
| Shortening | 2.00 |

| Ingredient | Baker's % |
|---|---|
| Emulsifier[1] | 1.30 |
| Yeast | 1.00 |
| Calcium propionate (mold inhibitor) | 0.34 |
| *Emulsified Slurry* | |
| Gelatinized starch (Baked bread) | 6.00 |
| Water | 15.00 |
| Emulsifier[2] | 0.43 |

[1] A blend of sodium alginate and diacetyl tartaric acid esters of mono- and di-glycerides available from Grindsted Products, Inc. under the trade name of Panodan 170.
[2] (Bealite 3401-L)

EXAMPLE 3

A French bread style microwave bread is prepared by the straight dough method plus emulsified slurry in a manner similar to the process of Example 1 having the following formulation:

| Ingredient | Baker's % |
|---|---|
| *Dough Formulation* | |
| Wheat flour | 100.00 |
| Water | 45.00 |
| Yeast | 3.00 |
| Shortening | 3.00 |
| Sugar | 3.50 |
| Salt | 2.00 |
| Emulsifier[1] | 1.30 |
| Calcium propionate | 0.30 |
| *Emulsified Slurry* | |
| Gelatinized starch (Baked bread) | 6.49 |
| Water | 15.14 |
| Emulsifier[2] | 0.43 |

[1] (Panodan 170)
[2] (Bealite 3401-L)

Microwave bread products of the present invention having long shelf life, good table life and desirable texture upon microwave susceptor reheating are prepared when the first emulsifier is replaced in whole or in part with an equivalent amount of an emulsifier blend comprising diacetyl tartaric acid esters of mono- and di-glycerides and mono- and di-glycerides of refined fats available from Grindsted Products, Inc. under the trade name Panodan 150.

EXAMPLE 4

A French-style fresh baked bread loaf of the present invention is prepared by the sponge dough method involving a preblend of the minors ingredients.

| Ingredient | Weight % |
|---|---|
| *Minors Preblend* | |
| Sugar | 46.00 |
| Salt | 25.00 |
| Emulsifier[1] | 15.00 |
| Emulsifier[2] | 10.00 |
| Calcium propionate | 4.00 |
| | 100.00% |

| Ingredient | Baker's % |
|---|---|
| *Emulsified Slurry* | |
| Baked bread | 6.00 |
| Water | 15.00 |
| Minors preblend | 4.25 |
| *Sponge Formulation* | |
| Wheat flour | 60.00 |
| Water | 35.00 |
| Yeast, compressed | 2.30 |
| *Dough Formulation* | |
| Wheat flour | 40.00 |
| Water | 10.00 |
| Shortening, vegetable | 2.30 |
| Yeast, compressed | 1.00 |
| Minors preblend | 4.00 |
| Emulsified slurry | 25.45 |

[1] (Panodan 170)
[2] (Bealite 3401-L)

EXAMPLE 5

A French style fresh baked bread load of the present invention involving a preblend of minor ingredients similar to Example 4 is prepared by using the straight dough method.

| Ingredient | Weight % |
|---|---|
| *Minors Preblend* | |
| Sugar | 44.00 |
| Salt | 27.00 |
| Emulsifier[1] | 15.00 |
| Emulsifier[2] | 10.00 |
| Calcium propionate | 4.00 |
| | 100.00% |

| Ingredient | Baker's % |
|---|---|
| *Emulsified Slurry* | |
| Wheat flour, pregelatinized | 100.00 |
| Water | 45.00 |
| Shortening, vegetable | 2.00 |
| Yeast | 2.00 |
| Minors preblend | 4.00 |

[1] (Panodan 170)
[2] (Bealite 3401-L)

EXAMPLE 6

A sour dough fresh baked bread load product of the present invention is prepared from the following:

| Ingredient | Baker's % |
|---|---|
| *Yeast Starter Batch Formulation* | |
| Wheat flour | 20.00 |
| Water | 10.00 |
| Yeast | 0.50 |
| *Sponge Formulation* | |
| Wheat flour | 30.00 |
| Yeast, compressed | 3.50 |
| Water | 15.00 |
| Whey, acid | 4.00 |
| Vinegar | 1.00 |
| Sugar | 2.00 |
| *Dough Formulation* | |
| Wheat flour | 50.00 |
| Whey, acid | 2.00 |
| Vinegar | 0.50 |
| Yeast, compressed | 3.00 |
| Salt | 2.00 |
| Water | 15.00 |
| Calcium propionate | 0.21 |
| Oxidizing agent | 0.008 |
| plus | |
| *Emulsified Slurry* | |
| Baked sour dough bread regrinds | 6.00 |
| Water | 10.00 |

| Ingredient | Baker's % |
|---|---|
| Emulsifier, Beatriame 3401-L | 0.44 |

EXAMPLE 7

A sour dough bread product of the present invention was prepared by the straight dough method as follows:

| Ingredient | Baker's % |
|---|---|
| Yeast Starter Batch Formulation | |
| Wheat flour | 19.34 |
| Water | 11.15 |
| Yeast, compressed | 0.48 |
| Dough Formulation | |
| Wheat flour | 86.66 |
| Yeast, compressed | 6.62 |
| Water | 28.44 |
| Whey, acid | 5.89 |
| Vinegar | 1.71 |
| Sugar | 1.77 |
| Salt | 1.64 |
| Calcium propionate | 0.21 |
| Oxidizing agent plus | 0.008 |
| Emulsified Slurry | |
| Baked sour dough bread regrinds | 6.32 |
| Water | 12.64 |
| Emulsifier, Beatriame 3401-L | 0.44 |

EXAMPLE 8

A honey wheat bread load product of the present invention was prepared by the straight dough method as follows:

| Ingredient | Baker's % |
|---|---|
| Dough Formulation | |
| Wheat flour | 100.00 |
| Water | 48.12 |
| Cracked wheat | 15.84 |
| Honey | 9.05 |
| Shortening, vegetable | 6.03 |
| Brown sugar | 5.91 |
| Yeast, compressed | 4.86 |
| Salt | 1.69 |
| Raisin juice concentrate | 0.75 |
| Calcium propionate | 0.36 |
| Oxidizing agent plus | 0.01 |
| Emulsified Slurry | |
| Baked Italian bread regrinds | 6.03 |
| Water | 12.07 |
| Emulsifier, Bealite 3401-L | 0.60 |

EXAMPLE 9

A honey wheat bread style bread load of the present invention was prepared by the sponge dough method as follows:

| Ingredient | Baker's % |
|---|---|
| Sponge Formulation | |
| Wheat flour | 34.39 |
| Cracked wheat | 15.84 |
| Water | 28.66 |
| Yeast | 3.17 |
| Brown sugar | 2.11 |
| Dough Formulation | |
| Wheat flour | 65.61 |
| Water | 19.46 |
| Honey | 9.05 |
| Shortening, vegetable | 6.03 |
| Brown sugar | 3.80 |
| Salt | 1.69 |
| Yeast, compressed | 1.69 |
| Raisin juice concentrate | 0.75 |
| Calcium propionate | 0.36 |
| Oxidizing agent plus | 0.01 |
| Emulsified Slurry | |
| Baked Italian Bread regrinds | 6.03 |
| Water | 12.07 |
| Emulsifier, Bealite 3401-L | 0.60 |

EXAMPLE 10

An Italian style bread product of the present invention was prepared by the straight dough method as follows:

| Ingredient | Baker's % |
|---|---|
| Dough Formulation | |
| Wheat flour | 100.00 |
| Water | 46.01 |
| Yeast, compressed | 2.88 |
| Salt | 2.33 |
| Emulsifier, Panodan 170 | 1.33 |
| Calcium propionate | 0.35 |
| Sugar | 3.71 |
| Shortening, vegetable plus | 5.54 |
| Emulsified Slurry | |
| Baked Italian bread regrinds | 6.62 |
| Water | 15.59 |
| Emulsifier, Bealite 3401-L | 0.44 |

EXAMPLE 11

An Italian bread of the present invention was prepared by the sponge dough method as follows:

| Ingredient | Baker's % |
|---|---|
| Sponge Formulation | |
| Wheat flour | 58.10 |
| Water | 36.22 |
| Yeast, compressed | 2.33 |
| Dough Formulation | |
| Wheat flour | 41.90 |
| Salt | 2.33 |
| Emulsifier, Panodan 170 | 1.33 |
| Calcium propionate | 0.35 |
| Sugar | 3.71 |
| Water | 9.79 |
| Shortening, vegetable | 5.54 |
| Yeast plus | 0.55 |

-continued

| Ingredient | Baker's % |
| --- | --- |
| Emulsified Slurry | |
| Baked Italian bread regrinds | 6.62 |
| Water | 15.59 |
| Emulsifier, Bealite 3401-L | 0.44 |

What is claimed is:

1. A method of improving the crust and crumb properties of a yeast leavened wheat, flour based water containing dough bakery product upon refreshening with microwaves, which comprises:
   incorporating into the dough prior to baking an effective amount of an emulsion, said emulsion comprising:
   (1) an antistaling dough conditioner,
   (2) up to about 20 parts per 100 parts flour or a farinaceous material having its starch component pregelatinized, and
   (3) about 7 parts to 30 parts of the water.

2. The method of claim 1
wherein the pregelatinized farinaceous material is selected from the group consisting of flour, starch, bread regrinds and mixtures thereof, and
wherein the dough comprises about 60 to 70 parts water per 100 parts flour.

3. The method of claim 2
wherein the emulsion additionally comprises: 4) about 0.1 to 8 parts by weight of the flour of an edible triglyceride, and
wherein the pregelatinized material is selected from the group consisting of wheat flour, wheat starch and wheat containing bread regrinds.

4. The method of claim 3
wherein the edible triglyceride comprises an oil.

5. The method of claim 4
wherein the dough comprises wheat flour, water, yeast, salt, and sugar.

6. The method of claim 5
wherein the dough conditioner comprises an emulsifier including diacetyl tartaric acid esters of mono- and di-glycerides.

7. The method of claim 6
wherein the emulsion comprises per 100 parts flour
   about 0.1 to 6 parts dough conditioner,
   about 7 to 16 parts water,
   about 15 to 20 parts pregelatinized farinaceous material, and
   about 1 to 5 parts oil.

8. The method of claim 7
wherein the farinaceous material includes bread regrinds.

9. The method of claim 8
wherein the dough conditioner further includes a second emulsifier comprising a blend of a) mono- and di-esters of fats and fatty esters, and b) mono- and di-glycerides.

10. A process for preparing a fresh, yeast raised bakery product of enhanced shelf life from a yeast leavened flour based dough and which is adapted to be refreshened by microwave heating, comprising the steps of:
   A. emulsifying about 7 to 30 parts of water with about 1 to 20 parts per 100 parts flour of a pregelatinized farinaceous material and with an antistaling dough conditioner to form an emulsified solution;
   B. mixing the emulsified solution with the balance of the dough formulation to prepare a bread dough;
   C. forming the dough into shaped, sized, yeast raised panned pieces; and
   D. baking the pieces to form a baked yeast raised bread product.

11. The method of claim 1 wherein the dough formulation comprises wheat flour, water, yeast, salt, sugar, and oil or fat.

12. The method of claim 11
wherein in Step A the emulsion comprises:
   1. about 7 to 16 parts water per 100 parts flour,
   2. about 0.1 to 3 parts per 100 parts flour of a dough condition, and
   3. about 1 to 20 parts of farinaceous material wherein the starch is gelatinized, and
   4. about 0.1 to 10 parts of an oil or fat and wherein the dough comprises about 60 to 70 parts water per 100 parts flour.

13. The method of claim 12
wherein the farinaceous material is selected from the group consisting of flour, starch and bread regrinds.

14. The method of claim 13
wherein in Step B the dough formulation comprises:
   1. 100 parts flour,
   2. about 50 to 60 parts water,
   3. about 2 to 6 parts yeast,
   4. about 1 to 20 parts oil or fat.

15. The method of claim 14
wherein in Step A the emulsion comprises:
   1. about 60 to 75 parts water,
   2. about 0.5 to 4.0 parts dough conditioner,
   3. about 20 to 40 parts of a farinaceous material,
   4. about 1 to 6 parts oil or fat.

16. The method of claim 15
wherein the farinaceous material is selected from the group consisting of wheat flour, wheat starch, wheat containing bread regrinds and mixtures thereof.

17. The method of claim 16
wherein the farinaceous material includes bread regrinds, and
wherein in Step D the baking step is practiced with steam to form a hard crusted baked yeast raised bread product.

* * * * *

UNITED STATES PATENT AND TRADEMARK OFFICE
CERTIFICATE OF CORRECTION

PATENT NO. : 5,049,398
DATED : September 17, 1991
INVENTOR(S) : Saari et al.

It is certified that error appears in the above-identified patent and that said Letters Patent is hereby corrected as shown below:

On the title page, item [21] should read:

Appl. No.: - "449,048" should be -- 448,048 --.

Abstract,
 line 5 - "preheated" should be -- reheated --.

Col. 10, line 33 - "condition" should be -- conditioner --.

Col. 12, line 16 - "load" should be -- loaf --.

Col. 12, line 41 - "load" should be -- loaf --.

Col. 13, line 39 - "load" should be -- loaf --.

Col. 13, line 66 - "load" should be -- loaf --.

Col. 16, line 25 - "condition" should be conditioner --.

Signed and Sealed this

Nineteenth Day of January, 1993

*Attest:*

DOUGLAS B. COMER

*Attesting Officer*      *Acting Commissioner of Patents and Trademarks*